United States Patent
Fisher

[15] 3,667,698
[45] June 6, 1972

[54] LOCKING SEAT BELT RETRACTOR

[72] Inventor: Robert C. Fisher, 580 E. Longlake Rd., Bloomfield Hills, Mich. 48013

[22] Filed: Jan. 22, 1971

[21] Appl. No.: 108,923

Related U.S. Application Data

[63] Continuation of Ser. No. 759,064, Sept. 11, 1968, abandoned, and a continuation-in-part of Ser. No. 629,689, Apr. 10, 1967, abandoned.

[52] U.S. Cl. .................................................242/107.4
[51] Int. Cl. .......................................................A62b 35/00
[58] Field of Search ..........242/107 R, 107 SB, 107.3, 107.4, 242/107.5, 107.6; 297/388; 280/150 SB

[56] References Cited

UNITED STATES PATENTS

| | | | |
|---|---|---|---|
| 3,174,704 | 3/1965 | Replogle | 242/107.4 |
| 3,138,405 | 6/1964 | Hanway | 242/107.4 X |
| 3,412,952 | 11/1968 | Wohlert et al. | 242/107.4 |
| 3,446,454 | 5/1969 | Kovacs et al. | 242/107.4 |

*Primary Examiner*—Werner H. Schroeder
*Attorney*—Harness, Dickey & Pierce

[57] ABSTRACT

This invention relates to an automatic locking seat belt retractor of the type in which the belt is wound on a spring actuated spool which exerts a constant belt retracting force on the belt while allowing the belt to be extended by manually pulling it off the spool, and in which means are provided for locking the belt against further extension at any desired degree of extension by locking the spool against unwinding rotation, which means operates in response to a limited retracting movement of the spool. The invention resides in an improved and simplified means for effecting such locking action consisting of a pawl and ratchet normally biased to an engaged position in which they prevent unwinding rotation of the spool and a member journaled concentrically with the spool for limited rotation and having a frictional driving connection with the spool. The said member is frictionally driven to one limit of its movement by a limited extension of the belt and in that position holds the pawl out of engagement during further extension. Initial retracting movement at any degree of extension moves the member to a position in which it allows pawl engagement; thereby locking the belt against further extension. The member is preferably so constructed that further retracting movement of the belt moves the member beyond the last mentioned position to a position in which it again holds the pawl out of engagement with the ratchet to minimize noise and wear during retraction.

The invention further contemplates means for unlocking the retractor manually and also an improved means for unlocking the retractor or holding it unlocked automatically when the belt is substantially fully retracted, said last mentioned means being driven by the spool and effective to hold the pawl out of engagement when the belt is fully retracted and during a limited initial extension from fully retracted position.

28 Claims, 10 Drawing Figures

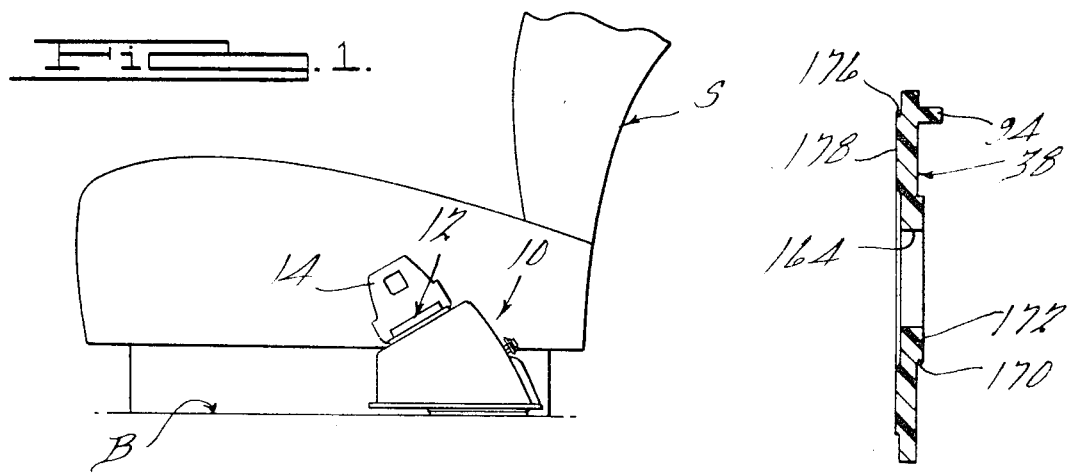
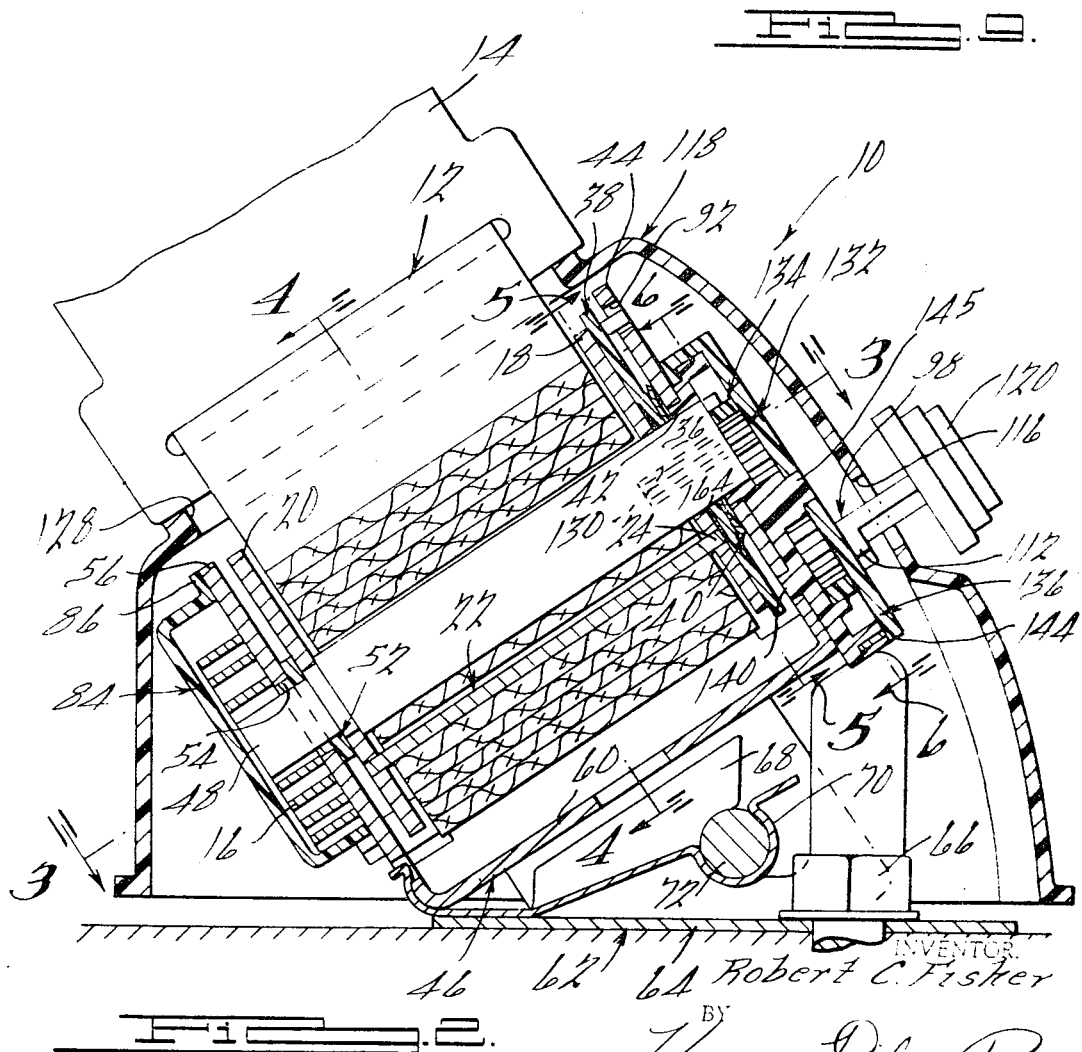

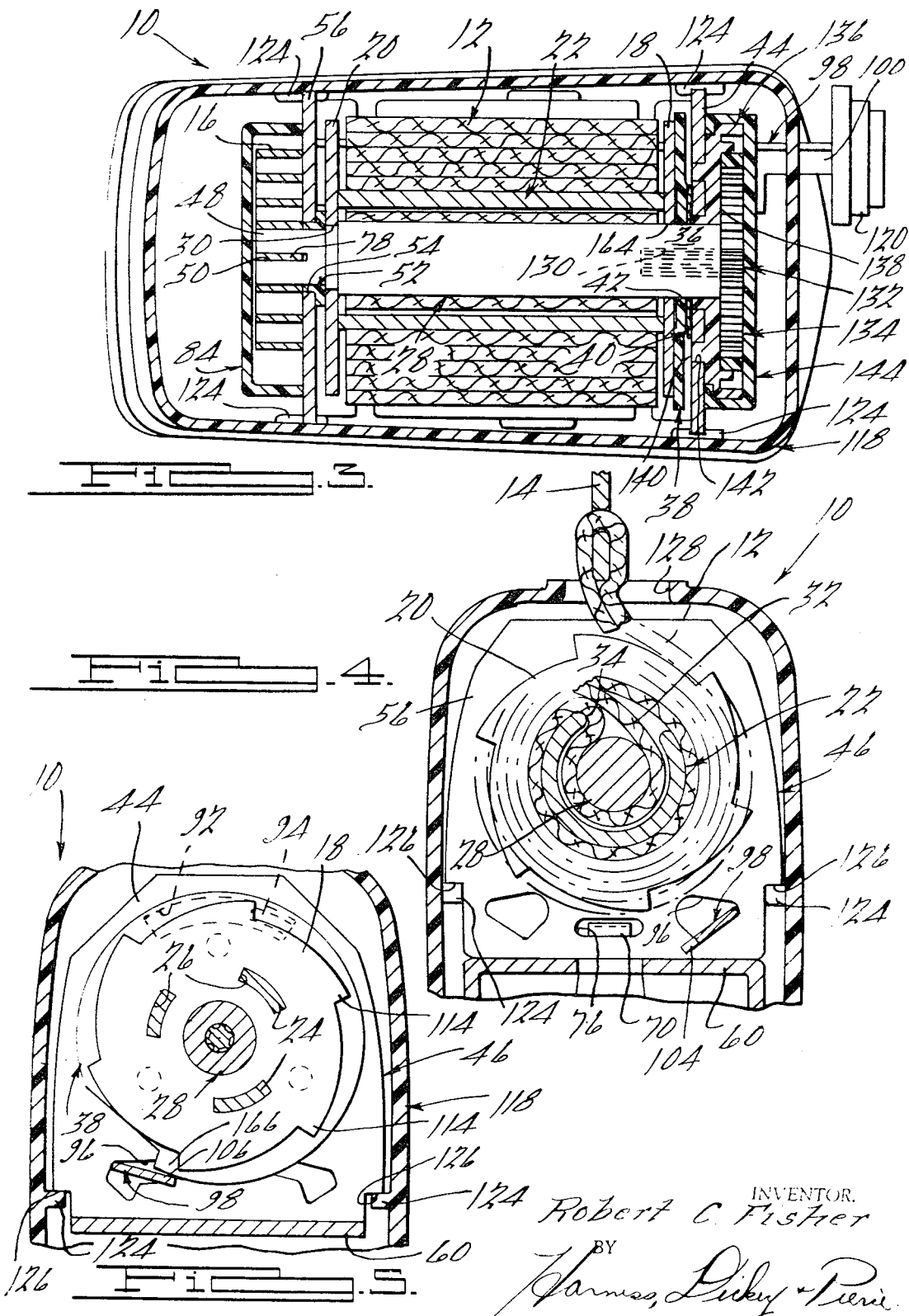

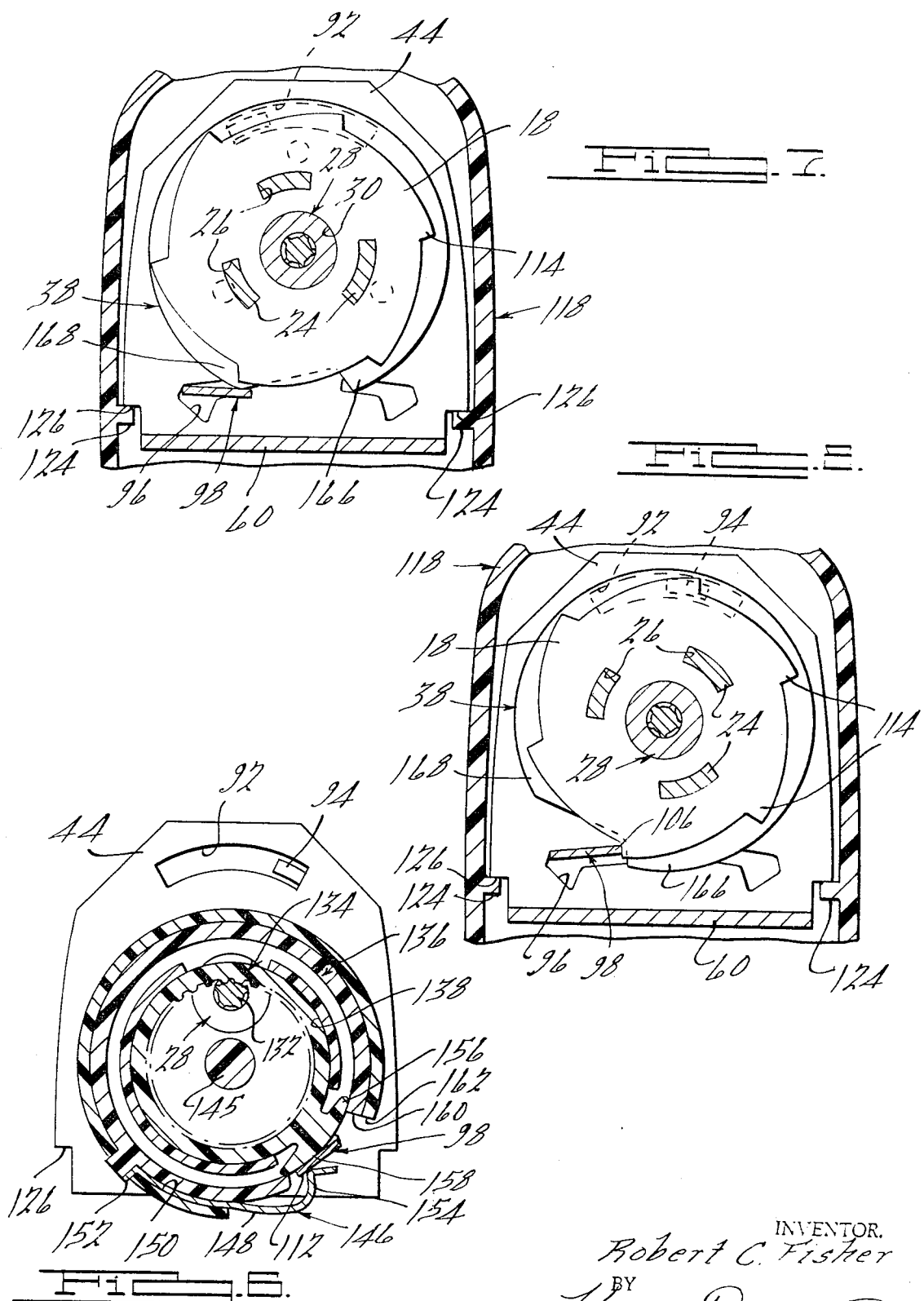

INVENTOR.
Robert C. Fisher

3,667,698

LOCKING SEAT BELT RETRACTOR

CROSS REFERENCE

This application is a continuation of applicant's application Ser. No. 759,064, filed Sept. 11, 1968, now abandoned, and a continuation in part of applicant's application Ser. No. 629,689 filed Apr. 10, 1967, now abandoned, both entitled Locking Seat Belt Retractor.

BACKGROUND OF THE INVENTION

Prior to the present invention the seat belt retractors in general use could not limit belt extension except when the belt was fully extended. This required the use of an adjustable buckle on one of the two belt sections. The provision of adjustment mechanism, in turn, required the use of a buckle which was undesirably large and heavy, and resulted in an unsightly length of loose belt end projecting from the buckle. A locking retractor which would lock the belt against further extension by locking the spool at any desired degree of extension in response to a limited retracting movement had been proposed by Edward H. Replogle and is disclosed in his U.S. Pat. No. 3,174,704. A retractor which functions in that manner permits the use of a short fixed length belt section in combination with the retractable section and a small, compact buckle. In addition, the winding spring of the retractor takes up slack in the belt after it is buckled and then locks the belt against further extension automatically. Retractors of this type require the provision of some means for holding the retractor unlocked when the belt is fully retracted and during the initial extension thereof. In the Replogle construction this function is performed by a lever which engages the coil of belt on the spool, senses the build up of that coil and is effective to unlock the retractor when the coil reaches a predetermined radius.

SUMMARY OF THE INVENTION

It is the general object of the present invention to provide an improved and simplified locking retractor of the type which automatically locks the spool at any degree of extension in response to a limited retracting movement and which is rugged in construction and compact in size.

A more specific object is to provide a locking retractor of the type mentioned having a pawl and ratchet for locking the spool against unwinding rotation and an improved and simplified means for automatically controlling the operation of the pawl and ratchet in such a manner as to allow locking of the spool in response to an initial retracting movement of the belt at any degree of extension. Another object is to provide a locking retractor of the type mentioned in which the means for controlling the pawl and ratchet automatically holds the pawl out of engagement with the ratchet not only during intentional extension of the belt but also during all but the initial retraction thereof.

A further object of the invention is to provide an improved mechanism for automatically disengaging the pawl or holding it disengaged when the belt is fully retracted and for holding the pawl disengaged during a limited initial extension from the fully retracted position. This mechanism is independent of the means for effecting automatic locking and is operated in response to spool rotation independently of the diameter or radius of the coil of belt on the spool.

BRIEF DESCRIPTION OF THE DRAWINGS

FIG. 1 is a side elevational view of a preferred embodiment of the locking seat belt retractor of the present invention, shown with the associated seat belt in a retracted condition;

FIG. 2 is an enlarged cross-sectional view of the retractor assembly illustrated in FIG. 1 with the belt fully retracted;

FIG. 3 is a cross-sectional view taken substantially along the line 3—3 of FIG. 2;

FIG. 4 is a transverse cross-sectional view taken substantially along the line 4—4 of FIG. 2;

FIG. 5 is a cross-sectional view taken substantially along the line 5—5 of FIG. 2, with the belt partially extended and with the parts in the position they occupy during extension of the belt.

FIG. 6 is a cross-sectional view taken substantially along the line 6—6 of FIG. 2, with the belt fully retracted;

FIG. 7 is a cross-sectional view similar to FIG. 5, but illustrates the pawl thereof disposed in an unlocked position during retraction;

FIG. 8 is a cross-sectional view similar to FIG. 7 and illustrates the pawl in a locked position;

FIG. 9 is a cross-sectional view of the cam plate taken in the same plane as FIG. 2.

DETAILED DESCRIPTION OF THE PREFERRED EMBODIMENT

Figure 10:
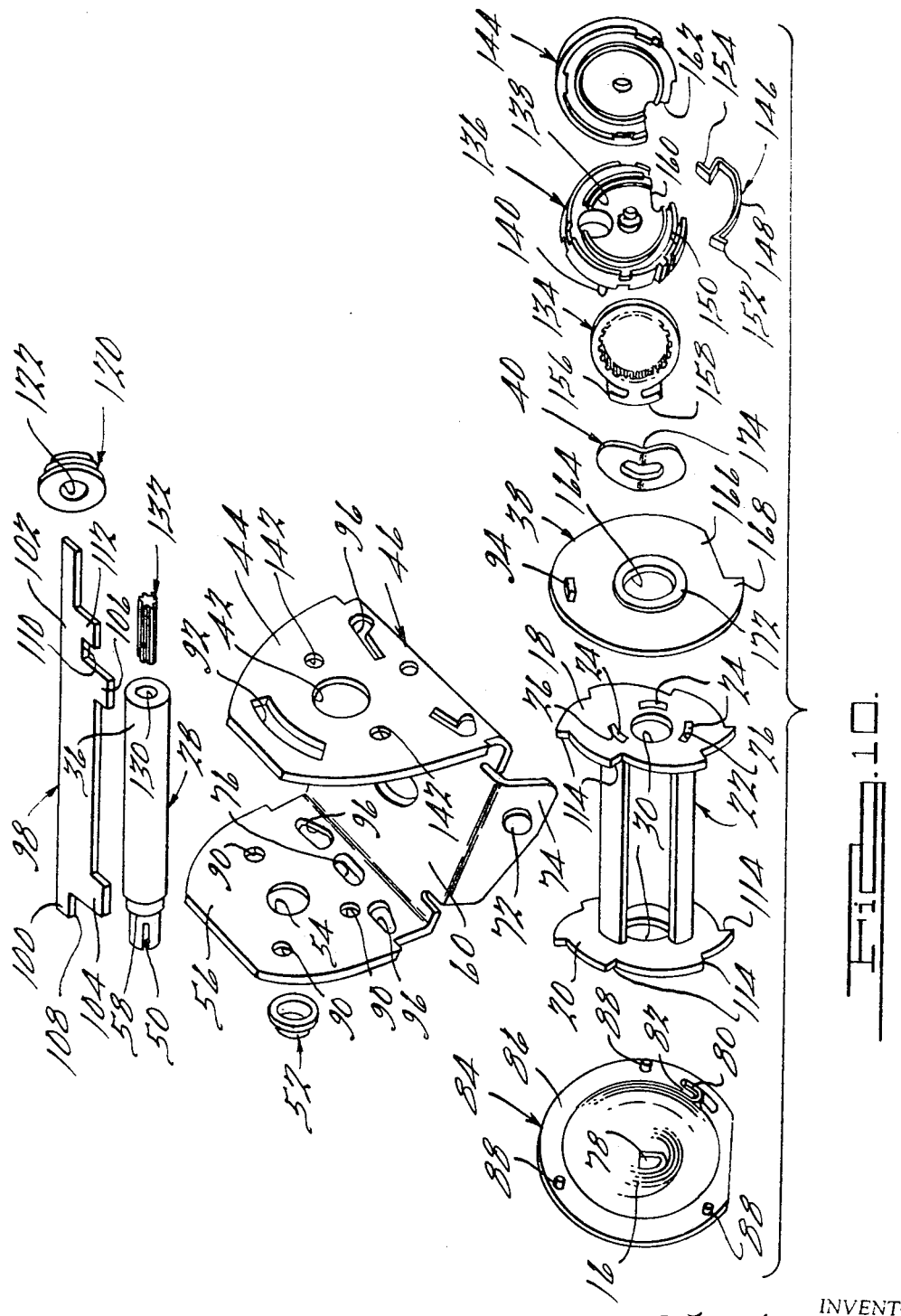
FIG. 10 is an exploded perspective view of the component parts of the locking seat belt retractor shown in FIGS. 1 through 9.

Referring now to the drawings, a locking seat belt retractor assembly 10 having a conventional fabric or similar type seat belt is shown mounted on the floor of a vehicle body member B adjacent the outboard side of the vehicle seat S, as illustrated in FIG. 1. The retractor assembly 10 is adapted to permit extension of the belt 12 so that the tongue 14 thereon can be detachably secured to a belt buckle on an associated belt half, not shown. When the belt 12 is not in use, the assembly 10 through operation of an internal coil spring 16 acting against a belt support spool later to be described, will function to retract the belt 12 and tongue 14 to the position illustrated in FIG. 1, where further retraction is prevented by engagement of the tongue 14 with the edges of the slot in the top of the retractor housing 118.

As best seen in FIGS. 3, 4, and 8, the assembly 10 comprises a pair of spool flanges 18 and 20 which are secured together by an open-sided, generally cylindrically shaped spool body 22 having a plurality of axially extending end fingers 24 projecting through a plurality of complementary shaped apertures 26 in the spool flanges 18 and 20. A shaft 28 extends coaxially through the spool body 22 and its opposite ends extend through a pair of central apertures 30 formed in the spool flanges 18 and 20. The shaft 28 is fixed to one or both of the spool flanges in any suitable manner, as by a press fit. A loop 32 on the belt 12 surrounds the shaft 28 within the interior of the spool body 22, with the remainder of the belt 12 extending outwardly through the open side 34 thereof of the spool body.

One end of the shaft 28, designated by the numeral 36, journal supports an annular cam plate 38 and a spring washer 40, the end 36 extending through and being supported within an aperture 42 formed in an upwardly extending support leg 44 of a rigid frame member 46. The opposite end 48 of the shaft 28 is formed with a diametrically extending slot 50 and is provided with a sleeve bearing member 52 which is preferably fabricated of a low friction synthetic material such as Nylon, Delrin or the like. The shaft end 48 and bearing member 52 are disposed within and supported by an aperture 54 formed in a second upwardly extending support leg 56 of the frame 46, and a radially extending shoulder 58 formed on the end 48 of the shaft 28 engages the bearing sleeve 52 and limits axial movement of the shaft to the left as viewed in FIG. 2.

As best illustrated in FIG. 3, the support legs 44 and 56 are arranged in spaced parallel relationship and extended upwardly from an intermediate support section 60 extending substantially perpendicular to the support legs 44 and 56. The frame member 46 may be secured to the floor or other structural body member B of the associated vehicle by any suitable means; however, the frame member 46 is preferably mounted on the body member B in the manner disclosed and claimed in U.S. Pat. No. 3,465,898 which is incorporated by reference herein. Generally speaking, the above identified patent application discloses a construction wherein the frame member 46 may be detachably secured to a base member 62 having a first portion 64 secured to the associated vehicle by means of a suitable bolt or the like 66 and a second portion 68 cooperable with a leaf-type spring element 70 adapted to fixedly engage a longitudinally projecting shaft member 72 which extends between and is supported by a pair of downwardly extending flanges, one of which is illustrated in FIGS. 2 and 10 and designated by the numeral 74, with said pair of flanges being integrally formed on and extending downwardly from the intermediate support section 60 of the frame member 46. The spring element 70 is adapted to secure the shaft 72 to the associated base member 62 and be detachably received within a generally oval-shaped opening 76 formed in the support leg 56 as best seen in FIG. 10.

The coil spring 16 is preferably fabricated of a strip of spring steel which is disposed in a coiled configuration, with the center of the coil defining a retaining portion 78 which projects into the slot 50 in the end portion 48 of the shaft 28. The opposite (outer) end of the coiled strip is reversely bent to form a hook 80 which is secured over an edge portion 82 of an annular, generally cup-shaped housing or enclosure 84 mounted on the outer side of the support leg 44. The enclosure 84 is formed with a radially extending flange 86 around the periphery thereof, which flange 86 is provided with a plurality of circumferentially spaced, inwardly extending projections 88 that are adapted to be inserted within complementary-shaped apertures 90 in the support leg 56 for fixedly retaining the enclosure 84 on the assembly 10.

As best seen in FIGS. 3 and 8, the support leg 44 of the frame member 46 is provided with an arcuate-shaped recess of slot 92 through which an outwardly or axially extending positioning finger 94 formed on the outer side of the cam plate 38 projects, the slot 92 functioning to limit the angular or rotational shifting of the plate 38 with respect to the shaft 28, as will later be described. A pair of generally pie- or wedge-shaped, laterally aligned apertures 96 are provided, one in each of the support legs 44 and 56, for operatively supporting a pawl 98 in the form of a flat bar which extends parallel to the shaft 28. The pawl bar 98, as best seen in FIG. 10, comprises a pair of longitudinally or outwardly extending end portions 100 and 102 and a pair of projections 104 and 106 which, as will be explained, cooperate with ratchet teeth formed on the spool flanges to lock the belt against extension. The reduced end 108 and the reduced section 110 of pawl 98 directly outboard of the projections 104 and 106, respectively, are adapted to fit within the aligned apertures 96 in the support legs 44 and 56 for supporting the pawl 98 for pivotal movement between locked and unlocked positions, as will later be described. Between the reduced section 110 and the adjacent extremity of the pawl 98 the pawl is provided with a tab 112 which lies in the same plane as projections 104 and 106 and is adapted to engage the pawl operating spring in a manner later to be described.

It will be seen that the pawl 98 is operatively supported relative to the spool in such a manner that the projections 104 and 106 are aligned and engageable with ratchet teeth 114 formed around the periphery of the spool flanges 18 and 20. Accordingly, when the pawl 98 is in locked position, as illustrated in FIG. 8, the projections 104 and 106 engage the ratchet teeth 114 and preclude further rotation of the spool in a clockwise direction.

The extremity of end portion 102 of the pawl 98 extends laterally outwardly beyond the support leg 56 and through a suitable opening 116 formed in the side of a generally cup-shaped housing or casing 118. As illustrated, a suitable manually engageable knob 120 having a central interior opening 122 is mounted on the end portion 100 exteriorly of the housing 118, as for example by having the end portion 100 press-fitted within the opening 122. The housing 118 is preferably fabricated of a durable, somewhat resilient or flexible material, such as plastic or vinyl, and is adapted to be surmounted over and enclose the assembly 10 in the manner illustrated in FIG. 2. The interior of the housing 118 is provided with a plurality of inwardly projecting retaining detents 124 which are adapted to "snap" into engagement with a pair of outwardly extending shoulder portions, generally designated 126, defined along the opposite edges of the support legs 44 and 56, to secure the housing 118 in the position illustrated. The upper end of the housing 118 is formed with an elongated slot 128 which is arranged generally parallel to the rotational axis of the spool member 22 and through which the seat belt 12 extends.

As best illustrated in FIGS. 2, 6, and 10, the end portion 36 of the shaft 28 is formed with an axially extending bore 130 in which is press-fitted one end of an elongated generally cylindrical-shaped, externally geared member 132, the member 132 thus being rigidly secured to the shaft 28. The geared member 132 projects beyond the end of the shaft 28 and meshes with an internally geared, generally ring-shaped member 134, as best illustrated in FIGS. 2 and 6.

The internal gear member 134 is secured on the outer side of the support leg 56 of the frame member 46 by means of a gear retainer member 136 in the form of a cup with outwardly projecting edges. The retainer 136 has an axially extending flange 138 forming an annular recess which fits the periphery of and thereby forms a bearing for the internal gear 134, so that the gear 134 will rotate about an axis parallel to and eccentric with respect to the axis of shaft 28, in the manner illustrated in FIGS. 2 and 6. The gear retainer 136 is secured to the frame member 46 by a plurality of laterally inwardly extending projections 140 that are press-fitted within suitable complementary-shaped apertures 142 in the support leg 44 of the frame member 46. A generally cup-shaped end cap 144 is adapted to be "snapped" over the outer side of the gear retainer 136 and functions to cover the gears 132 and 134, as well as the retainer 136, to protect the gears from dirt or other foreign material. The retainer 136 is provided with a projection 145 coaxial with the internal gear 134 which projects into an opening in the cap 144. In a preferred construction of the present invention, the geared member 134, gear retainer member 136 and enclosure member 144 are fabricated of a plastic material such as Nylon or other easily fabricated material; and the retainer 136 is provided with an inwardly projecting flange which projects into the opening 42 of the support leg 44 of the frame member 46 and serves as a support and bearing for the shaft 28 as shown in FIG. 2.

As best illustrated in FIG. 6, means in the form of a generally arcuate shaped pawl operating spring 146 is provided on the assembly 10 for normally biasing the pawl 98 to the position shown in FIG. 8 wherein the projections 104 and 106 engage the ratchet teeth 114 on the spool flanges 18 and 20, and lock the spool against clockwise rotation thereby preventing extension of the belt. The spring 146 comprises a main body portion 148 which is nested within arcuate-shaped channel 150 formed in the projecting edge of retainer 136, which extends generally circumferentially around the center of rotation of the internal gear 134. One end of the body portion 148 of the spring 146 is formed with a generally outwardly projecting flange section 152 which prevents relative sliding movement of the spring 146 within the channel member 150. It will be seen that the spring member 146 extends generally parallel to the leg portion 56 of the frame 46 at a position laterally outwardly therefrom, and comprises a generally L-shaped abutment section 154 at the end thereof opposite the flange section 152. The abutment section 154 is adapted to engage the tab 112 of the pawl 98 in the manner illustrated in FIG. 6, and thereby resiliently bias the pawl 98 toward its locked position shown in FIG. 8. As will be apparent, pivotal movement of the pawl 98 toward the unlocked position shown in FIGS. 6 and 7 will be yielding resisted by the spring 146.

The internal gear 134 is provided with a radially outwardly extending, generally arcuate-shaped boss 156 which defines a curved camming surface 158 on the radially outermost portion thereof. The inner side of the boss 156 is provided with a slot to receive the annular flange 138 of retainer 136. The gear 134 is oriented with respect to the gear 132 and pawl 98 such that the boss 156 thereof engages the tab 112 of the pawl 98 and maintains the same in unlocked position during such time as the belt 12 is substantially retracted or wound within the assembly 10. As the belt 12 is extended or pulled out of the assembly 10 the shaft 28 will rotate one revolution for each revolution which the belt 12 is wound on the spool 16; however due to the drive ratio between the gears 132 and 134, the boss 156 will be rotatably displaced from the pawl 98 less than one full rotation in a counterclockwise direction as viewed in FIG. 6, even though the belt 12 is completely unwound from the spool 22, i.e., fully extended. As best seen in FIGS. 6 and 10, the retainer 136 is provided with an access opening 160 which is aligned with a similar opening 162 on the end cap 144 to permit the boss 156 and the spring 146 to engage the tab 112 of the pawl 98.

As best illustrated in FIG. 10, the cam plate 38 is of a generally annular disc-shaped configuration and is formed rotatably supported on shaft 28 by its central opening 164. The cam plate 38 is also formed with a pair of lobe portions 166 and 168, which, when the cam plate 38 is properly rotatably positioned relative to the pawl 98, engage the projection 106 of the pawl 98 and thereby prevents pawl from engaging the ratchet teeth or any portion of the end flanges 18 and 20 of the spool.

The cam plate 38 is held in frictional engagement with the outer face of the end flange 18 of the spool by the spring washer 40 on shaft 28. The spring washer may be positioned at either end of the spool, but as shown is positioned between the cam plate and the support leg 44 of the frame 46 To insure that the cam plate is frictionally driven within its limits of movement by the spool it is only necessary that the mean effective radius of the area of frictional driving contact between the cam plate and the spool end flange be larger than the mean effective radius of the area of frictional engagement between the cam plate and the member which presses the cam plate against the spool flange if that member is a stationary member. This condition is more than satisfied if the cam plate is pressed against the spool flange by a spring washer which has a radius less than the mean effective radius of the area of contact between the cam plate and the spool flange, as shown in FIG. 2, even if the washer in normally stationary.

Further assurance that the cam plate will be frictionally driven by the spool is preferably provided by forming the cam plate with an annular axial projection 170 of small external diameter at the side which faces support leg 44 of the frame 46 and an annular axial projection 176 of larger internal diameter on the opposite side, as shown in FIG. 9. This insures an area of contact 172 that has less mean effective radius than that of the area 178 which contacts the spool flange. With this arrangement, the spring washer could be mounted at the opposite end of the spool, if desired.

It will be understood that when the spool is rotated in one direction it will frictionally drive the cam plate until projection 94 engages one end of the slot 92 in support leg 44, as shown in FIG. 6, whereupon further rotation of the spool in the same direction may continue while the cam plate remains stationary. When the spool rotates in the opposite direction it will frictionally drive the cam plate until the projection 94 engages the opposite end of the slot 92, whereupon the spool may continue rotation while the cam plate remains stationary. The arrangement is such that when the cam plate is driven to one limit of movement by retraction of the belt the cam lobe 168 engages projection 106 of pawl 98 and holds the pawl out of engagement with the ratchet flanges on the spool. When the cam plate is driven to its opposite limit of movement by extension of the belt the cam lobe 166 engages projection 106 of pawl 98 and holds the pawl out of engagement with the ratchet flanges. At an intermediate position of the cam plate the notch between the lobes 166 and 168 allows the pawl 98, under the influence of spring 146 to engage the ratchet teeth unless such movement is prevented by boss 156 on internal gear 134, as will be further explained.

The operation of the seat belt retractor 10 can best be described by following through a complete sequence of operation starting from the full retracted condition shown in FIGS. 1, 2 3, 4, and 6 of the drawings. As seen in FIG. 2, the belt 12 is fully wound on the spool 22, with the looped end of the belt 12 disposed over the shaft 28. During the initial portion of the previous retraction cycle, the cam plate 38 carried in a counterclockwise direction as illustrated in FIG. 7 to bring the lobe portion 168 into engagement with the projection 106 of the pawl 98 to retain the projections 104 and 106 out of engagement with the ratchet teeth 114 and the spool flanges 18 and 20. It will be observed that the radius of lobe 168 is slightly greater than the maximum radius of the ratchet teeth and therefore the cam plate moves the pawl completely out of engagement with the ratchets. This final movement is effected by the gentle slope of the notch between lobes 166 and 168 adjacent lobe 168. This condition permits smooth and silent retraction of the belt 12 on the spool 20. When the belt 12 is fully would upon the spoon 22, the boss portion 156, and more particularly the arcuate camming surface 158 thereof, is engaged with the tab 112 of the pawl 98, thereby maintaining the pawl 98 in a position in which the projections 104 and 106 thereof are disengaged from the teeth 114 on the spool flanges 18 and 20. Normally the pawl will be disengaged from the ratchet teeth by cam plate 38 during retraction and therefore boss 156 will merely move into position to hold the pawl out of engagement. However, if for any reason cam lobe 168 fails to disengage the pawl or if lobe 168 is omitted, boss 156 will effect disengagement.

When the fully retracted belt is initially extended, the cam plate 38 starts to rotate in a clockwise direction as viewed in FIG. 7 toward the position shown in FIG. 8. It will be observed that this initial motion releases the pawl 98 from lobe 168 and would allow the pawl to engage the ratchet teeth and lock the retractor, thus preventing extension, unless some means such as the gear driven boss 156, is provided to hold the retractor in unlocked condition.

As previously indicated, it had been proposed that this unlocking function be performed by having the belt as it built up on the spool engage a member that will release the pawl when the belt is fully retracted. The mode of operation is possible with the present construction provided a sufficient length of belt is put on the spool so that on full retraction the belt engages a portion of the pawl such as one or both of the projections 104 and 106. However, this in not the recommended way of using the mechanism. Accordingly it is preferred to so limit the total length of belt on the spool that it does not contact any portion of the pawl, and to rely upon the improved means for that purpose disclosed herein, namely the gear driven boss 156, which occupies the position shown in FIG. 6 when the belt is fully retracted. At the same time the cam plate occupies the position shown in FIG. 7 due to the fact that the previous retraction of the belt was accompanied by counterclockwise rotation of the spool as viewed in FIG. 7.

Initial extension of the fully retracted belt causes a counterclockwise rotation of the spool 22 and shaft 28 as viewed in FIGS. 4 and 6, with the result that the gear 132 and internal gear 134 will rotate in the same direction, or clockwise as viewed in FIG. 7. Such rotation of the internal gear 134 will result in the boss portion 156 moving out of engagement with the tab 112. However, the simultaneous rotation of the spool 22 will result in rotation of the cam plate 38 to insert the cam lobe portion 166 into engagement with the projection 106 to retain the pawl 98 in its retracted position, as illustrated in FIG. 5, before the boss 156 releases the pawl. Thereafter, as much of the belt 12 as is needed may be pulled from the belt spool 22 which freely rotates in a clockwise direction, as viewed in FIG. 5, while the projections 104 and 106 are held from engagement with teeth 114 by the cam lobe 166. When the belt 12 is extended to the position desired by the user, the spring 16 is permitted to slightly retract the belt 12 and effect counterclockwise rotation of the spool 22, as viewed in FIG. 5, the first increment of which movement moves the cam plate 38 in a counterclockwise direction, thereby moving the lobe portion 166 out of a position of engagement with the projection 106 and to the position illustrated in FIG. 8 in which the pawl 98 locks against the teeth 114 on the spool flanges 18 and 20, and prevents further belt extension. A convenient method of using the retractor is to extend the belt slightly more than necessary to buckle its terminal to the matching belt section. Then when the buckled belt is released, spring 16 takes up the slack and restores the retractor to locked condition.

If a large amount of retraction is required to take up the slack, the cam lobe 168 is moved into a position of engagement with the projection 106 which holds the pawl 98 out of engagement with the teeth 114 of the spool ends 18 and 20. Thereafter, a slight outward pull on the belt 12 will rotate the cam lobe 168 out of contact with the pawl, permitting the spring 146 to move the projections 104 and 106 of the pawl 98 into position of engagement with the teeth 114 and securely lock the belt 12 in an adjusted position, as shown in FIG. 8. It will be noted that as shown in FIG. 8, the pawl has engaged a ratchet tooth and thereby stopped clockwise (unwinding) rotation of the spool before the pawl engaged the steep side of notch in the cam plate 38 adjacent lobe 166. Depending upon the relative positions of the cam disk and the ratchet at the start of the slight outward pull on the belt referred to above, the steep side of the notch in the cam disk could engage the pawl before the pawl is engaged by a ratchet tooth. If that happens the pawl simply drops into the notch and stops clockwise movement of the cam disk in response to a slight extension as viewed in FIG. 8 and the ratchet continues to rotate in a clockwise direction until a tooth engages the pawl. This insures that the retractor will resume it locked state after any degree of partial retraction.

In view of the foregoing, if any further outward adjustment of the belt 12 is required after the retractor is locked, the belt must first be retracted within the housing 118 sufficiently to have the gear 134 rotate to a position wherein the boss 156 engages and biases the pawl 98 to its unlocked position; or, alternatively the pawl must be unlocked manually by use of knob 120, which can be used at any time to release the pawl.

It will be noted that the aperture 96 in support leg 44 has a slot-like extension, shown best in FIG. 5. This is provided to permit passage of the projections 104 and 106 through the aperture 96 in leg 44 during assembly of the retractor. The pawl is inserted through aperture 96 in leg 44 before the shaft, spool and cam plate 38 are assembled. Thereafter the ratchet and flanges on the spool prevent upward pivotal movement of the projections 104 and 106 far enough for them to become aligned with the slot-like extension of the aperture 96. Duplicate apertures 96 are illustrated in each support leg to permit use of the same frame for either right or left hand retractors, which would have spools rotating in opposite directions during belt extension.

While it will be apparent that the preferred embodiment of the invention illustrated herein is well calculated to fulfill the the objects above stated, it will be appreciated that the present invention is susceptible to modification, variation, and change without departing from the proper scope or fair meaning of the subjoined claims.

What is claimed is:

1. In a locking seat belt retractor comprising a frame, a spool mounted for rotation on said frame and adapted to have a belt wound thereon, a flexible belt adapted to be wound on said spool, a spring constantly urging the spool in one direction of rotation to retract the belt thereon, a ratchet and pawl mechanism operable when the ratchet and pawl are engaged to prevent belt extension by preventing rotation of said spool in the unwinding direction of rotation, said ratchet being rotatable with and connected to the spool and said pawl being pivoted on said frame and constantly biased in a direction to cause it to engage the ratchet and stop rotation of said spool in said unwinding direction, wherein the improvement comprises the combination of the foregoing elements with a member journaled for rotary movement about the axis of the spool, means for limiting such rotary movement of the member in both directions to less than one revolution from one limit to the other, a lost motion frictional driving connection between said spool and said member for driving said member in both directions within said limits of movement, said member having a surface operable to hold the pawl out of engagement with the ratchet when the member is rotated to one of said limits of movement in response to unwinding rotation of said spool and said surface being so formed as to release the pawl for movement toward engagement with the ratchet when the member is rotated away from said one limit of movement, and means for disengaging said pawl from the ratchet.

2. A seat belt locking retractor as claimed in claim 1 further characterized by the fact that the last named means includes mechanism independent of said member for automatically holding said pawl out of engagement with the ratchet when the belt is substantially fully retracted by windup of the belt on the spool and which becomes inoperative to prevent engagement of the pawl after a limited unwinding movement of the spool sufficient to operate said member to the position in which it holds the pawl out of engagement with the ratchet.

3. A seat belt locking retractor as claimed in claim 2 further characterized by the fact that said mechanism functions in direct response to rotation of and is driven by said spool independently of the thickness of the total belt windings on the spool.

4. A seat belt locking retractor as claimed in claim 1 further characterized by the fact that said last named means includes a second surface on said member which moves the pawl out of engagement with the ratchet when the member is rotated by winding motion of said spool from a position in which the first mentioned surface on the member has released said pawl to the other limit of movement in order to eliminate noise and wear due to drag of the pawl on the ratchet during retraction of the belt.

5. A seat belt locking retractor as claimed in claim 4 further characterized by the provision of mechanism independent of said member for automatically holding the pawl out of engagement with the ratchet when the belt is substantially fully retracted by windup of the belt on the spool and which becomes inoperative to prevent engagement of said pawl with said ratchet after a limited unwinding movement of the spool sufficient to operate said member to the position in which said first mentioned surface of the member holds the pawl out of engagement with the ratchet.

6. A seat belt locking tractor as claimed in claim 5 further characterized by the fact that said mechanism functions in direct response to rotation of and is driven by said spool independently of the thickness of the total belt windup on the spool.

7. A locking seat belt retractor comprising a frame, a spool mounted for rotation on said frame and adapted to have a belt wound thereon, a flexible belt adapted to be wound on said spool, a spring constantly urging the spool in one direction of rotation to wind the belt thereon, a ratched and pawl mechanism operable when the ratchet and pawl are engaged to prevent rotation of said spool in the unwinding direction of rotation, said ratchet being rotatable with and connected to the spool and said pawl being movably mounted on said frame and constantly biased in a direction to cause it to engage the ratchet and stop rotation of said spool in said unwinding direction, wherein the improvement comprises a first means for holding said pawl out of engagement with said ratchet during unwinding rotation of said spool and operable in response to an initial winding rotation to allow the pawl to engage the ratchet so that it thereafter blocks further unwinding rotation, and a second means operable independently of said first means for holding said pawl out of engagement with said ratchet, said second means being positively driven by said spool upon rotary movement of the spool and effective to hold the pawl out of engagement when the belt is substantially fully retracted independently of buildup thereof on the spool and to become thereafter inoperative in response to a limited unwinding rotation sufficient to cause said first means to hold said pawl out of engagement with said ratchet.

8. A locking seat belt retractor as claimed in claim 7 further characterized by the fact that said second means comprises a gear rotatably mounted on said frame and driven from the spool through gear train having a ratio such that less than one full rotation of said second means is achieved during full unwinding rotation of said spool.

9. A self-retracting webbing roller apparatus for safety belts comprising:
   a. a main housing having a base plate and side walls;
   b. a spring-loaded roller rotatably mounted in said housing;
   c. at least one toothed wheel fixed to the roller;
   d. a pivotally mounted and spring-loaded pawl having a locked position and an unlocked position;
   e. a self-acting member controlling the pawl, said member comprising a rotatably mounted disk adjacent said toothed wheel and having a cam;
   f. spring means mounted in said housing forcing the said disk against said toothed wheel to cause a frictional contact between said disk and said toothed wheel;
   g. means limiting the turning range of the disk to a small angle of rotation;
   h. the pawl contacting the cam to be in unlocked position during the uncoiling of a belt and said pawl being disengaged from said cam to be in locked position when tension on belt is reduced.

10. A self-retracting webbing roller apparatus as defined in claim 9 wherein a spring housing is secured to the outer side of the main housing to accommodate a return spring which is operably connected with the said roller.

11. A self-retracting webbing roller apparatus as defined in claim 9 wherein the said limiting means includes stops mounted within said housing.

12. In a seat belt retractor assembly,
a relatively non-rotatable support structure,
spool means adapted to have a seat belt wound thereon,
means for rotatably supporting said spool means, latch means mounted on said support means and movable between a first position engaging said spool means to limit rotation thereof, and a second position disengaged from said spool means,
cam means movable to an actuated position engaging said latch means and thereby resisting movement of said latch means from said second position toward said first position,
clutch means drivingly connected said cam means with said spool means,
said clutch means comprising an annular disc-shaped member rotatably mounted coaxially of said spool means,
said member comprising a first annular axially outwardly projecting portion defining a first radially disposed annular surface spaced axially outwardly from said member and a second annular axially outwardly projecting portion defining a second radially disposed annular surface spaced axially inwardly from said member, and
a spring element fricitionally engageable with one of said annular surfaces and resiliently urging said member axially toward a position wherein the other of said annular surfaces is frictionally engageable with said spool means, said first and second axially projecting portions defining with said support structure and said spool means radially spaced annular recessed areas substantially radially aligned with said second and first portions, respectively.

13. In a seat belt retractor assembly,
a spool means adapted to have a seat belt wound thereon,
shaft means rotatably supporting said spool means,
a support bracket for operatively supporting said shaft means and comprising a pair of substantially spaced parallel support members,
a pair of laterally aligned openings formed in said members,
latch means comprising a latching bar extending between said support members and having first and second portions thereof received within said openings, whereby said latching bar is movable between a first position engaging said spool means to limit rotation thereof, and a second position disengaged from said spool means,
spring means extending substantially parallel to said support members and normally urging said latching bar toward said first position,
cam means mounted on said shaft means and rotatably in response to rotation of said spool means for resisting movement of said latching bar toward said first position,
second cam means drivingly connected to said shaft means and movable in response to rotation thereof to bias said latching bar toward said second position when the seat belt is substantially retracted on said spool means, and
housing means substantially enclosing said second cam means and having said spring means mounted at least partially therewith.

14. An assembly as set forth in claim 12 which includes first spring means normally urging said latch means toward said first position, and second spring means resiliently urging said disc shaped member toward said one end of said spool means.

15. An assembly as set forth in claim 14 wherein said latching means comprising a latching bar extending substantially parallel to said spool means, which includes a support bracket comprising a pair of spaced parallel support members, and which includes guide means on said latching bar cooperable with said support members for supporting said latching bar for movement between said first and second positions.

16. An assembly as set forth in claim 15 wherein said guide means defines a tab portion engageable with said first spring means for normally urging said latching bar toward said first position.

17. In a seat belt retractor assembly,
spool means adapted to have a seat belt wound thereon,
shaft means rotatably supporting said spool means,
a support bracket for operatively supporting said shaft means and comprising a pair of substantially spaced parallel support members,
a pair of laterally aligned openings formed in said members,
a latching bar extending laterally between aid support members and movable between a first position engaging said spool means to limit rotation thereof, and a second position disengaged from said spool means,
guide means on said latching bar cooperable with said openings in said support members for supporting said latching bar for said movement between said first and second positions,
cam means mounted on said shaft means and rotatable in response to rotation of said spool means for resisting movement of said latching bar toward said first position,
spring means normally urging said latching bar toward said first position,
said guide means defining a tab portion on said latching bar engageable with said spring means,
second cam means drivingly connected to said shaft means and movable in response to rotation thereof to bias said latching bar to said second position when the seat belt is substantially retracted on said spool means, and
housing means substantially enclosing said second cam means and having said spring means supported at least in part therein.

18. The invention as set forth in claim 12 wherein the entirety of said second portion of said member is located radially outwardly from said first annular surface.

19. The invention as set forth in claim 12 wherein the entirety of said first portion of said member is located radially inwardly from said second annular surface.

20. The invention as set forth in claim 12 wherein said second surface area is larger than said first surface area.

21. A retractor assembly as set forth in claim 12 wherein said clutch means is integral with said cam means.

22. A retractor assembly as set forth in claim 12 wherein said cam means comprises an eccentric peripheral portion of said disc-shaped member.

23. In a locking seat belt retractor comprising a frame, a spool including a ratchet mounted for rotation on said frame, a flexible belt wound on said spool, a spring constantly urging the spool in a direction of rotation to wind the belt thereon, and a pawl biased in a direction to engage the ratchet on said spool to stop rotation thereof in the unwinding direction, the improvement comprising a pawl control element mounted for movement between a release position wherein it releases said pawl for engagement with said ratchet and a holdout position wherein it holds said pawl out of engagement with said ratchet, a constantly engaged lost motion frictional driving connection between said spool and said element for driving said element in opposite directions between said two positions, said pawl when released by said control element for engagement with the ratchet being effective to prevent movement of said control element to said holdout position, and means independent of said element operable to hold said pawl out of engagement with said ratchet when the belt is substantially completely wound upon said spool and until the spool is rotated in an unwinding direction an amount sufficient to drive said pawl control element to its holdout position.

24. A locking seat belt retractor in accordance with claim 23 wherein said independent means comprises a gear driven from said spool and having a surface engagable with said pawl.

25. In a locking seat belt retractor comprising a frame, a spool including a ratchet mounted for rotation on said frame, a flexible belt wound on said spool, a spring constantly urging the spool in a direction of rotation to wind the belt thereon, and a pawl biased in a direction to engage the ratchet on said spool to stop rotation thereof in the unwinding direction, the improvement comprising an element mounted for movement between a winding holdout position and an unwinding holdout position and operative to hold said pawl out of engagement with said ratchet when in either of said positions, a lost motion frictional driving connection between said spool and said element for driving said element in opposite directions between said two positions, said element being constructed to release said pawl for engagement with said ratched when said element is intermediate said positions but being effective to move the pawl out of engagement with the ratchet when said element moves from its intermediate position to its winding holdout position, said pawl when released for engagement with the ratchet being effective to prevent movement of said element to said unwinding holdout position, and means independent of said element operable to hold said pawl out of engagement with said ratchet when the belt is substantially completely wound upon said spool and until the spool is rotated in an unwinding direction an amount sufficient to drive said element to its unwinding holdout position.

26. A locking seat belt retractor in accordance with claim 25 wherein said element is freely movable from said intermediate position to said winding holdout position.

27. A locking seat belt retractor in accordance with claim 25 wherein said independent means comprises a gear driven from said spool and having a surface engagable with said pawl.

28. A locking seat belt retractor in accordance with claim 8 wherein said second means comprises an internal gear mounted for rotation about an axis parallel to the axis of said spool.

* * * * *